US006931448B2

(12) United States Patent
Höller et al.

(10) Patent No.: US 6,931,448 B2
(45) Date of Patent: Aug. 16, 2005

(54) METHOD, SERVER AND ARRANGEMENT IN A COMMUNICATION NETWORK

(75) Inventors: Jan Höller, Kungstensgatan (SE); Aimo Tuoriniemi, Ristiniementie (FI); Göran Eriksson, Trädgårdsgatan (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 906 days.

(21) Appl. No.: 09/768,953

(22) Filed: Jan. 24, 2001

(65) Prior Publication Data

US 2001/0026554 A1 Oct. 4, 2001

(30) Foreign Application Priority Data

Jan. 26, 2000 (EP) ............................................. 00850016

(51) Int. Cl.[7] ......................... G06F 15/16; G06F 11/00; G06F 15/173; H04O 7/20
(52) U.S. Cl. ....................... 709/227; 370/235; 455/445; 709/226
(58) Field of Search ......................... 370/235; 455/445; 709/226

(56) References Cited

U.S. PATENT DOCUMENTS

| | | | | |
|---|---|---|---|---|
| 6,094,431 A | * | 7/2000 | Yamato et al. | 370/395.21 |
| 6,487,595 B1 | * | 11/2002 | Turunen et al. | 709/226 |
| 6,584,110 B1 | * | 6/2003 | Mizuta et al. | 370/401 |
| 6,693,912 B1 | * | 2/2004 | Wang | 370/401 |
| 6,708,034 B1 | * | 3/2004 | Sen et al. | 455/445 |
| 6,721,272 B1 | * | 4/2004 | Parnafes et al. | 370/235 |
| 6,732,177 B1 | * | 5/2004 | Roy | 709/227 |

OTHER PUBLICATIONS

Chiruvolu, Girish et al. "Mobility and QoS support for IPv6–based Real–time Wireless Internet Traffic". XP–002145404. 1999 IEEE. pp. 334–338.

Mahadevan, Indu et al. "An Experimental Architecture for providing QoS guarantees in Mobile Networks using RSVP". XP–002145405. 1998 IEEE. pp. 50–54.

International Search Report as Completed by the ISA/EP on Jun. 18, 2001, in connection with European Patent Application No. PCT/EP01/00288.

Brichau, G., European Search Report, App. No. EP 00 850016, Aug. 22, 2000, pp. 1–2.

Chiruvolu, G. et al., "Mobility and QoS Support for IPv6–based Real–time Wireless Internet Traffic," IEEE, 1999, Corporate Research Center, Alcatel USA, Richardson, TX, pp. 334–338, XP002145404.

Mahadevan, I. et al., "AnExperimental Archittecture for Providing QoS Guarantees in Mobile Networks Using RDVP," IEEE, 1998, pp. 50–54, Washington State University, XP002145405.

* cited by examiner

*Primary Examiner*—John Follansbee
*Assistant Examiner*—Philip Lee

(57) ABSTRACT

The present invention relates to resource reservation for establishing end-to-end quality of service in a digital communication system, without resource reservation signalling over the access bearer. The solution, according to the invention is to remove the resource reservation protocol signalling on the IP level, over the access interface, e.g. the expensive and narrow radio channel, and introduce an resource reservation protocol proxy in the network. The introduction of the proxy functionality still supports the possibility, or meets the requirement, to reserve resources end to end.

32 Claims, 8 Drawing Sheets

METHOD, SERVER AND ARRANGEMENT IN A COMMUNICATION NETWORK

FIELD OF INVENTION

The present invention relates to an application level server, a method and an arrangement in a digital communication system. More specifically the present invention relates to resources reservation for establishing end-to-end quality of service.

DESCRIPTION OF RELATED ART

Multimedia communications has been explored in a number of different organisations and bodies. The currently predominant framework for multimedia in packet-based networks is provided by International Telecommunication Union—Telecommunication sector (ITU-T) recommendation H.323 and its associated recommendations. H.323 describes an architecture for multimedia as well as a suite of protocols for its operation. Other schemes for multimedia communication also exist and may equally apply for the application, such as those developed by IETF in e.g. workgroups Multiparty Multimedia Session Control (MMUSIC) and Session Initiation Protocol (SIP) with protocols such as SIP, Session Description Protocol (SDP) and Real Time Streaming Protocol (RTSP).

The packet network is commonly based on the Internet Protocol (IP). The IP network may or may not support the reservation of resources or any other mechanism to provide quality of service. In the absence of real resource reservation mechanisms, the H.323 procedures of admission requests, bandwidth requests etc. are more of an authorisation nature and do not guarantee any service performance per se. In order to provide a reliable service with a predictable and guaranteed level of service and behaviour, Quality of service needs to be provided by the underlying IP network so that resources can be allocated to cater for the application's needs.

When introducing multimedia communications in a cellular environment, the radio spectrum efficiency must be optimised due to the high costs involved. At the same time, and competing with the efficiency issue, a certain quality and service behaviour must be combined with a maintained multimedia service flexibility.

One method to provide an IP bearer quality of service is provided in the Integrated Service (IS) framework of Internet Engineering Task Force (IETF) and within IS using a Resource reSerVation Protocol (RSVP). IS with RSVP may be used to provide end-to-end Quality of service.

RSVP is a per flow, i.e. unidirectional, reservation protocol in which the source host of the flow initiates a reservation procedure by sending an RSVP Path (Path) message towards the flow sink host. It is then the task of the sink host to perform the actual reservation upstream towards the source host by returning an RSVP Reservation (Resv) message. The message includes information of desired bandwidth and other channel resources. The source host then confirms the reservation (ResvConf).

The application of RSVP in conjunction with H.323 multimedia is specified in the ITU-T H.323 02/98 standard. A schematic block diagram of one way of performing the basic operation of resource reservation H.323 capable environment is shown in FIG. 1. A communication system 100 includes an H.323 Gatekeeper (GK) 101, which is a H.323 entity, that among other things can provide address translation, access control, and bandwidth management to the Local Area Network (LAN) for H.323 terminals and Gateways. FIG. 1 is simplified and schematic, and call signalling, terminal capability exchange, master slave determination etc. are excluded in the Figure. Focus is on relevant parts of the signalling between a terminal 102, the H.323 Gatekeeper 101, an RSVP capable subnetwork 103, a H.323 capable IP network 104 and an end node 105.

The H.323 client 106 resides in the application layer, the RSVP 107 belongs more in the IP layer and in the Figure also the link layer is 108 shown. The layers referring to the Open Systems Interconnection (OSI) model, which is an international recommendation defined by International Standard Organisation (ISO). The example shown relates to a Gatekeeper routed call and H.245 control version. The ITU-T H.245, 09/98 standard is a control protocol for multimedia communication.

Below is a list of the significant steps carried out for resource reservation:

109 In the Admission ReQuest (ARQ) of H.323 the client indicates that it has a capability to reserve resources by setting the TransportQoS field value of ARQ appropriately.

110 The H.323 GK confirms the request by returning Admission ConFirmed (ACF), and in this example indicating that the client may use its resource reservation capabilities.

111 When it is time, the client opens a logical channel by sending an OpenLogicalChannel message of H.245 to the gatekeeper including information regarding the requested quality of service in the QoSCapability field, which then contains the requested RSVP parameters.

112 The OpenLogicalChannel message is sent across the network usually to the other endpoint.

113 When step 112 has been acknowledged with an a OpenLogicalChannelAck message, it is time to request the IP bearer service with the appropriate quality of service which is typically initiated by the H.323 client application which requests quality of service from the RSVP functional entity of the terminal 102, as indicated by step 113 in the Figure.

114 The initiation of the quality of service request is performed by sending the RSVP Path message to the subnetwork 103 and 115 further on to the end node 105 via the IP network 104.

A more complete signal flow for the above mentioned steps is shown in FIG. 2 where a bi-directional communication for a two-way speech is established. The OpenLogicalChannel is assumed here to establish a bi-directional logical channel. RSVP establishes one reservation per flow direction. In this fashion, resources are reserved within the IP layer and quality of service as required is provided. Note that the resource reservation is independent of the underlying link layer technology. This is a necessity in order to be able to provide quality of service end to end across heterogeneous networking technologies where IP is the common denominator.

The current multimedia solutions have been built with fixed access networks in mind. Care has not been taken to act for the specific needs of a cellular or wireless environment.

FIG. 3 shows a schematic and simplified view of one example of an application of multimedia communication based on H.323 signalling 301 in a cellular environment. The terminal 302 could for instance comprise a cellular phone connected to a laptop running the H.323 client software. Other configurations are also possible. The terminal has, via a Radio Access Bearer 303 over the air interface access to a radio access node 304 which in turn has access to the rest of an H.323 capable IP network 305. The wording "radio access node" used in this patent application is a general wording and shall not be mixed up with the particular radio access nodes as they may be defined in other technologies e.g. in GSM, EDGE, UMTS etc. A Gatekeeper 306 and an end node 307 are connected to the network.

QoS is typically required end to end 308 including over the radio access. The terminal 302 has the capability to reserve resources using RSVP.

Using known art of resource reservation in combination with H.323, a typical sequence diagram of the resulting signalling between the Terminal 302, the Radio Access Node 304, the Gatekeeper 306 and the rest of the H.323 capable IP network 305 is provided in FIG. 4. The signalling between the Terminal 302 and the Radio Access Node 304 is performed over the Air Interface 400. The signalling is extracted to show only the parts relevant to the actual resource reservation.

401 The terminal 302 requests admission to establish a call using H.225.0/RAS signalling, ITU-T H.225.0/RAS is protocol for Registration, Admission and Status signalling for packet-based multimedia communications systems. The terminal 302 also indicates that it has capabilities to reserve resources in the TransportQoS field in the ARQ message. The request is accepted and confirmed by the Gatekeeper 306 by returning ACF which notifies that the Terminal 302 may use its resource reservation capabilities.

402 Call control signalling (CCS) using H.225.0/Q.931 as well as other signalling such as master slave determination, terminal capability exchange etc. using H.245 signalling takes place. ITU-T H.225.0/Q.931 is protocol for Call Control signalling and ITU-T H.245 09/98 is a control protocol for multimedia communication.

403 A bi-directional logical channel is opened containing the resource reservation quality of service parameters in RSVP format using H.245 signalling.

404 A radio access bearer 303 is established with a corresponding quality of service. How this is done, when it is done etc. is of no significance here, only that it is necessary at some stage.

405 The resource reservation for an end to end quality of service IP bearer service is established using RSVP signalling. This is done using the previously exchanged quality of service parameters. The reservation is done per flow, in this case for a bi-directional communication.

It is obvious that the extensive signalling presents both a performance and cost problem over the air interface. The signalling is required for establishing the quality of service but also for maintaining the quality of service since RSVP uses a so-called soft state mechanism in which the RSVP messages are periodically sent (typically 30 s. intervals) to refresh the bearer reservation. The typical messages of H.245 have a mere length of 20 bytes, whereas RSVP messages have typical lengths of 150 to 230 bytes.

SUMMARY OF THE INVENTION

The problems discussed in the present disclosure are the following.

In a cellular environment, radio spectrum efficiency is of paramount importance. The cost for radio spectrum is high, and it is a strong desire to utilise the radio spectrum for as many users as possible at any given instance in time. Therefore the need to conserve channel bandwidth is of very high interest. On the other hand, the end user expects a certain level of service quality, or service behaviour, of which service response time to an end-user service request is one, requiring low latency of signalling message transfer and small amount of signalling messages to be exchanged.

These two requirements represent a duality problem. Looking at control signalling, the resulting signalling load is dependent on the number of messages exchanged over the air, as well as the message lengths. By narrowing the control channel bandwidth, the message transfer time increases and the network response time perceived by the end user increases accordingly.

To sum up, the resource reservation signalling costs a significant amount of bandwidth. Therefore, in cases with bandwidth restrictions or high cost of bandwidth, a method of establishing quality of service end-to-end, but without resource reservation signalling over the access bearer, is needed.

Another problem is when end-to-end IP quality of service is desirable but the terminal lacks a resource reservation protocol on IP level. In this case is also a method needed for establishing quality of service end-to-end, in which no IP resource reservation signalling takes place over the access bearer.

Accordingly, it is an object of the present invention to unravel the above-mentioned problems.

The solution, according to the invention is to remove the resource reservation protocol signalling on the IP level, over the access interface, e.g. the expensive and narrow radio channel, and introduce a resource reservation protocol proxy in the network. The introduction of the proxy functionality still supports the possibility, or meets the requirement, to reserve resources end to end by establishing resources with quality of service on the link layer over the access interface.

An application level server for managing the resource reservation to establish quality of service according to the invention includes a functional entity. This functional entity identifies necessary parameters required for performing the resource reservation and changing signalling messages. The functional entity further requests from a resource reservation protocol proxy, quality of service between an access node and an end node. The server instructs the terminal to not use its resource reservation protocol if it has any.

A communication system for carrying out resource reservation to establish quality of service between a terminal and an end node includes an IP network. A resource reservation protocol proxy, the end node and the application level server mentioned above are connected to the IP network. The terminal is connected to an access node by means of establishing an access bearer with quality of service in a link level. The access node is connected to the resource reservation protocol proxy which performs resource reservation to establish quality of service on an IP level, between the proxy and the end node. The IP network uses a resource reservation protocol.

According to a third aspect of the invention, the server indicates that the resource reservation signalling applies from the access node towards the end node. The server further identifies parameters, necessary for reserving resources to establish quality of services. The proxy reserves resources with quality of service on the IP level, according to the necessary parameters. The resources are reserved between the access node and the end node. An access bearer with a quality of service on the link level is established between the terminal end the access node.

According to a fourth aspect, the invention can be implemented by software code segments and e.g. be stored in any of the relevant entities of a communication system, such as a resource reservation proxy, an application level server, a gatekeeper etc. The computer program product is directly loadable into the internal memory of a digital computer within the entitles and includes the software code portions for performing the steps of the method according to the invention, when said program is run on a computer.

According to a fifth aspect of the invention the computer program product is stored on a computer usable medium, comprising readable program for causing a computer, within an entity in the communication system according the invention, to control an execution of the steps of the method according to the invention.

An advantage of the present invention is that less bandwidth is required over the terminal access interface since the resource reservation signalling is removed over the access interface.

Another advantage of the present invention is that it is possible to establish end-to-end quality of service even if the terminal has no capabilities to reserve resources at the IP level over the access interface.

A further advantage of the present invention is that it implies transparency for applications across the network. The end node sees no difference whether the terminal has used resource reservation or if the proxy has done it on behalf of the terminal instead. Also as the server has the possibility to decide whether the terminal shall use resource reservation or not, the introduction of the resource reservation protocol proxy has no impact on existing implementations of terminals.

The wording resource reservation protocol used in this patent application shall be interpreted as a general wording, including any protocol for reserving resources at IP level.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is a block diagram showing the basic operation of resource reservation in an H.323 environment.

FIG. 2 shows a schematic signalling sequence over the basic operation of resource reservation using RSVP in the H.323 architecture.

FIG. 3 is a schematic block diagram illustrating a multimedia communication based on H.323 in a cellular environment.

FIG. 4 shows a schematic signalling sequence over the basic operation of applying the H.323 architecture in a cellular environment.

DESCRIPTION OF PREFERRED EMBODIMENTS

FIGS. 1–4 are Figures related to Prior Art and are described under "Description of related art".

When communicating over IP and requiring resource reservation e.g. for voice over IP, multimedia, real-time conversational services, audio streaming, video streaming, web surfing with a guaranteed bitrate, etc., etc., there is a requirement both of bandwidth efficiency and a necessary IP quality of service, needing a significant degree of expensive bandwidth, as identified above. Another problem is when a terminal does not have the possibility to reserve the necessary IP quality of service, but quality of service is required.

The solution relies on the facts that the underlying link layer in the access interface, e.g. the radio interface, can provide the required quality of service over the link. This link is a dedicated resource, and it provides the necessary and required quality of service in a predictable and guaranteed way. Reserving the necessary link quality of service, such as bandwidth, means that resources at the IP layer need not be explicitly reserved over the access interface. In the access network, resource reservation protocol signalling can be generated and terminated using a resource reservation protocol proxy, thus fulfilling the requirement of an IP bearer quality of service end-to-end.

Figure 1:
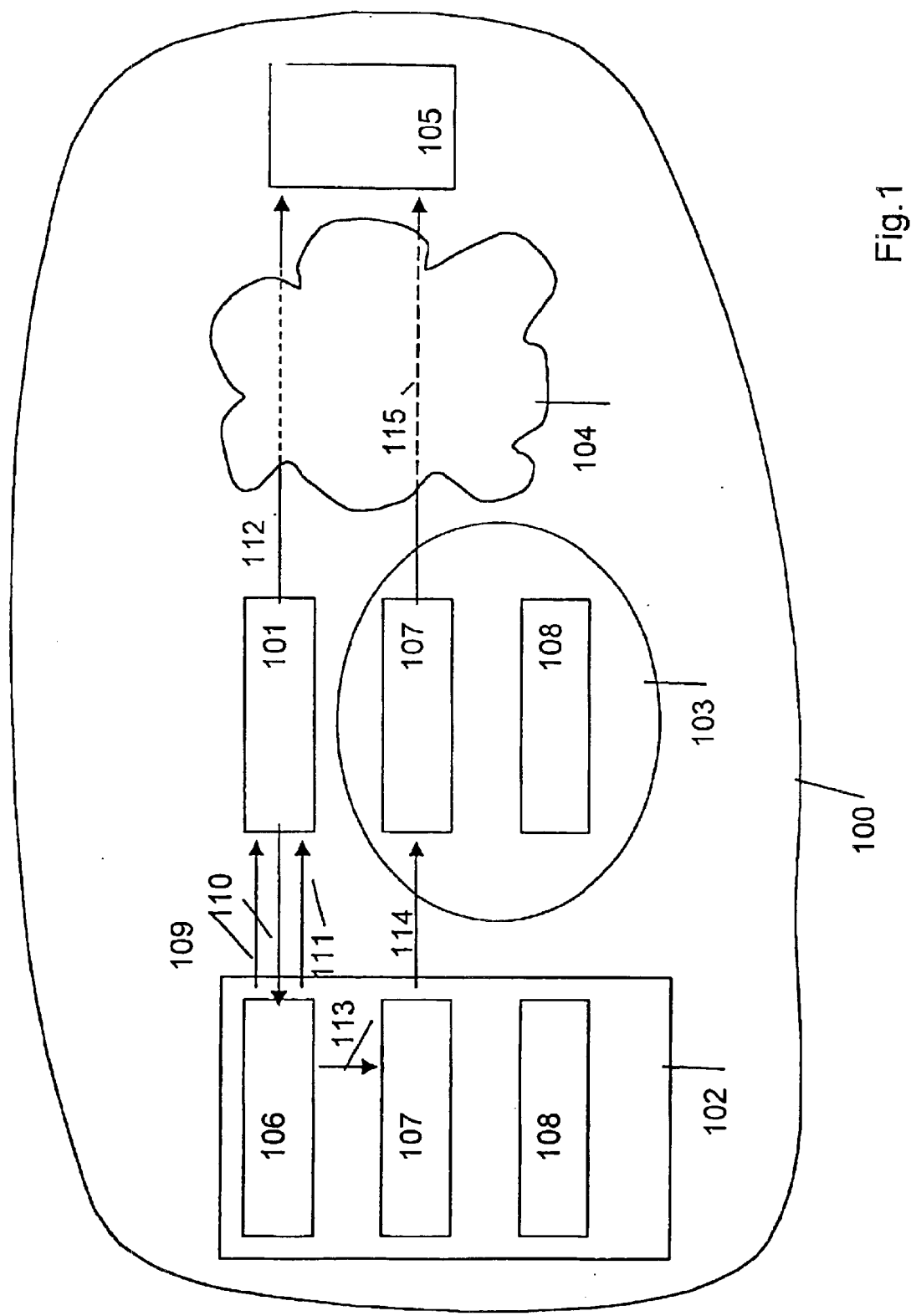
FIGS. 1–4 relates to Prior Art and are thus described above under "Description of related art".
Figure 2:
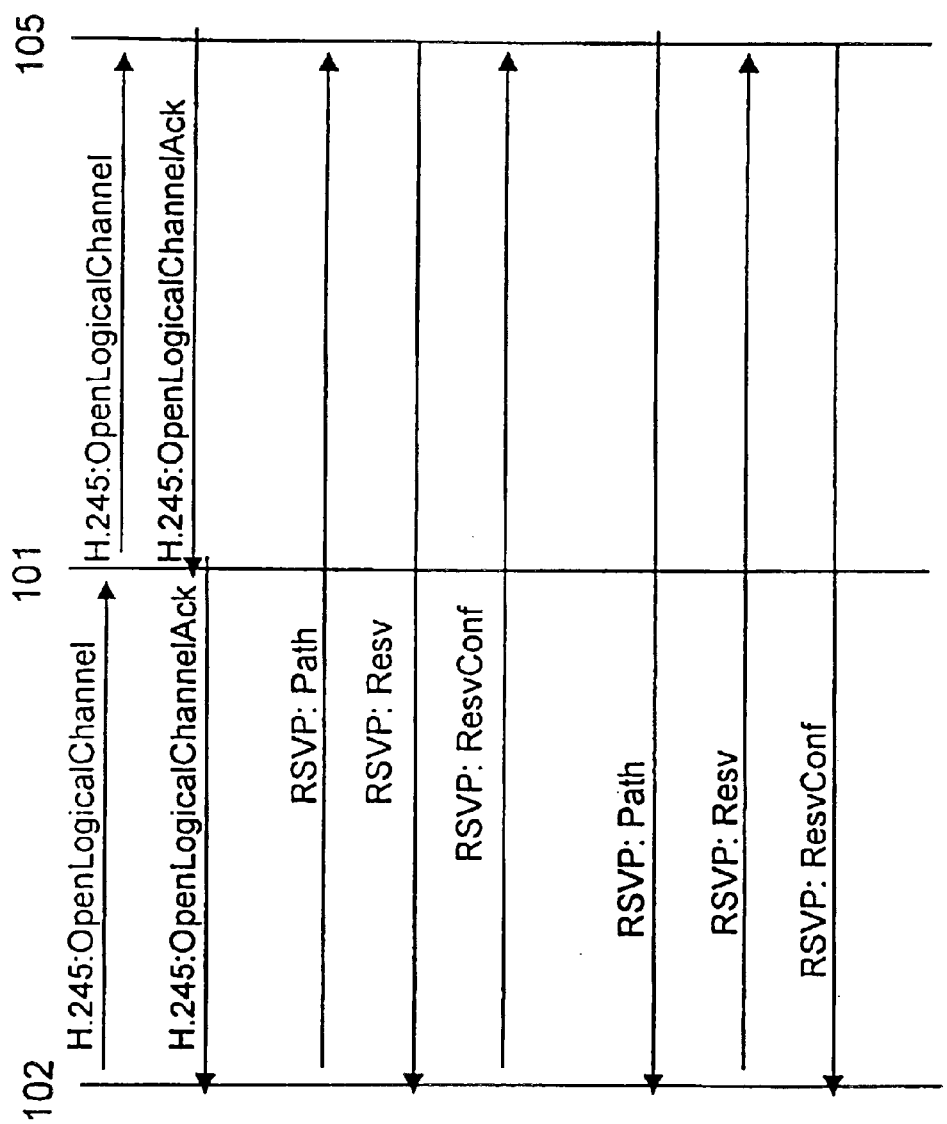
Figure 3:
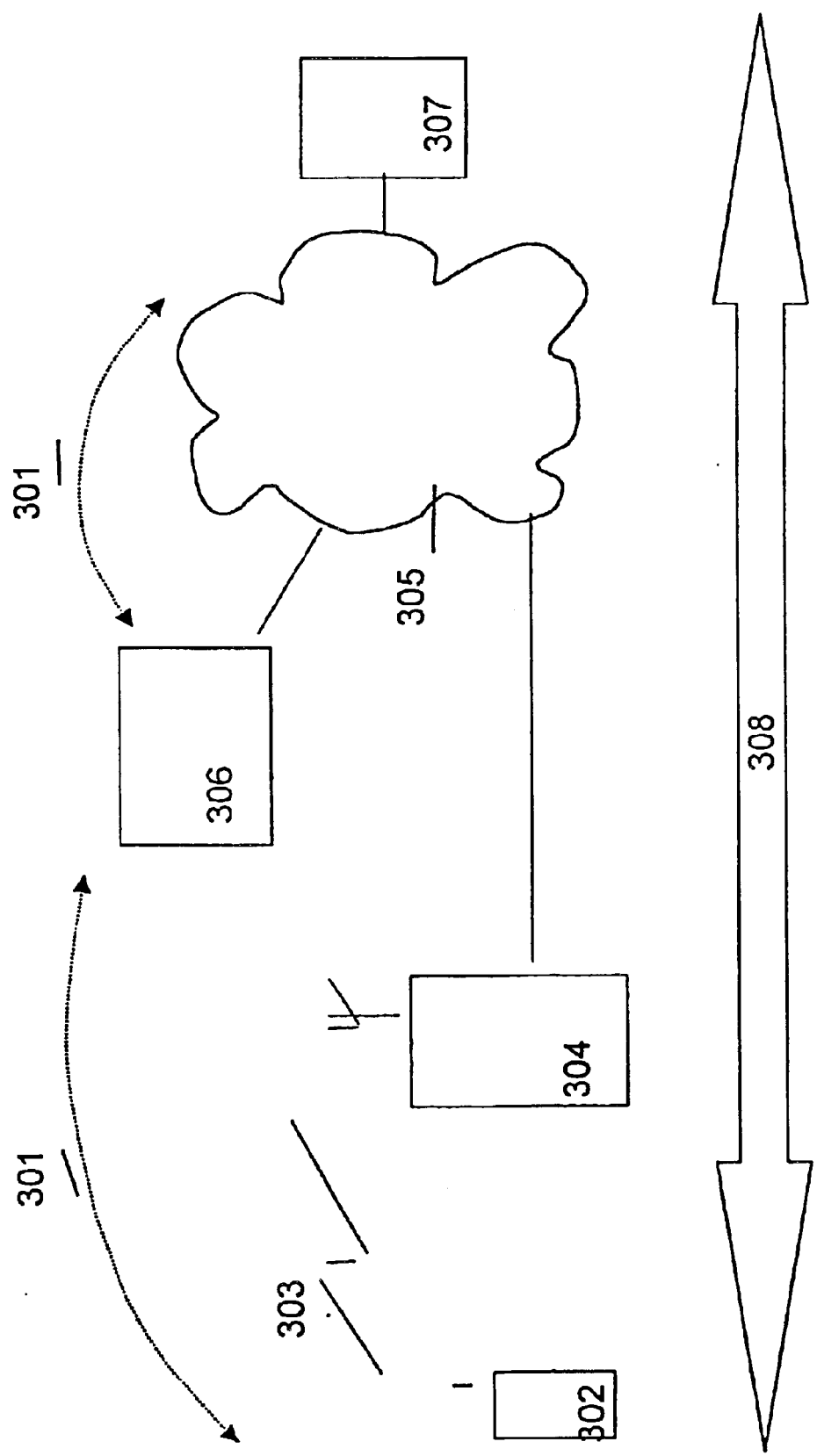
Figure 4:
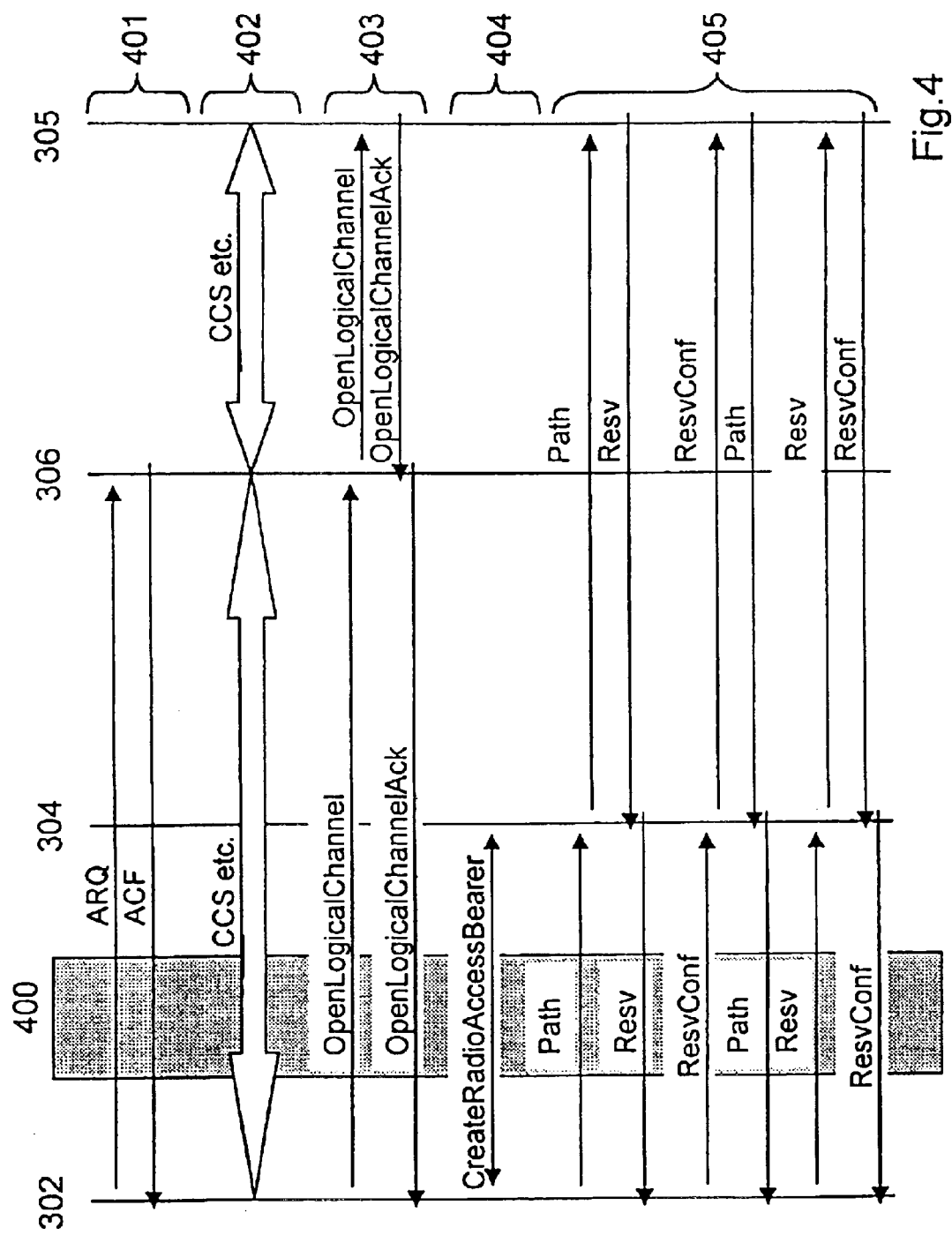
Figure 5:
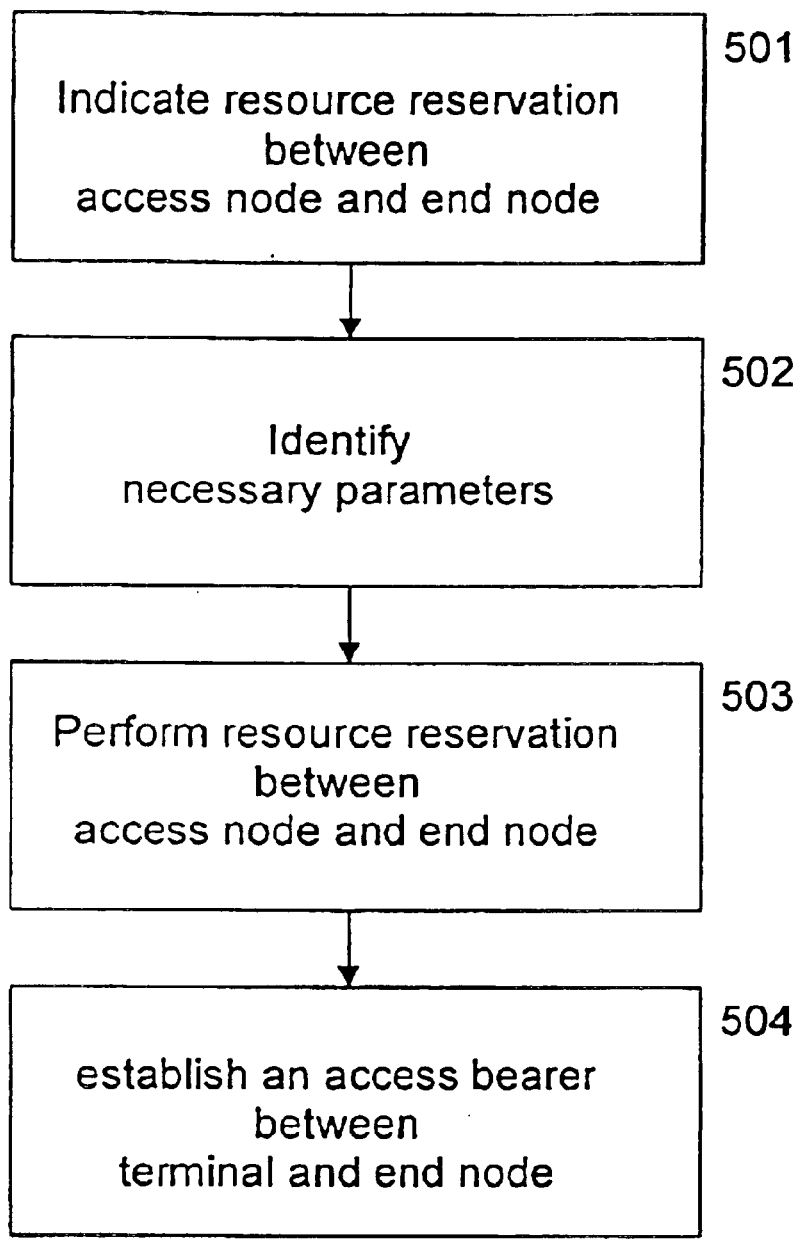
FIG. 5 shows a flowchart of the method according to the invention

FIG. 5 shows a flowchart of establishing end-to-end quality of service according to the invention in a general mode. The quality of service is established between a terminal and an end node over an IP network in a communication system.

Figure 7:
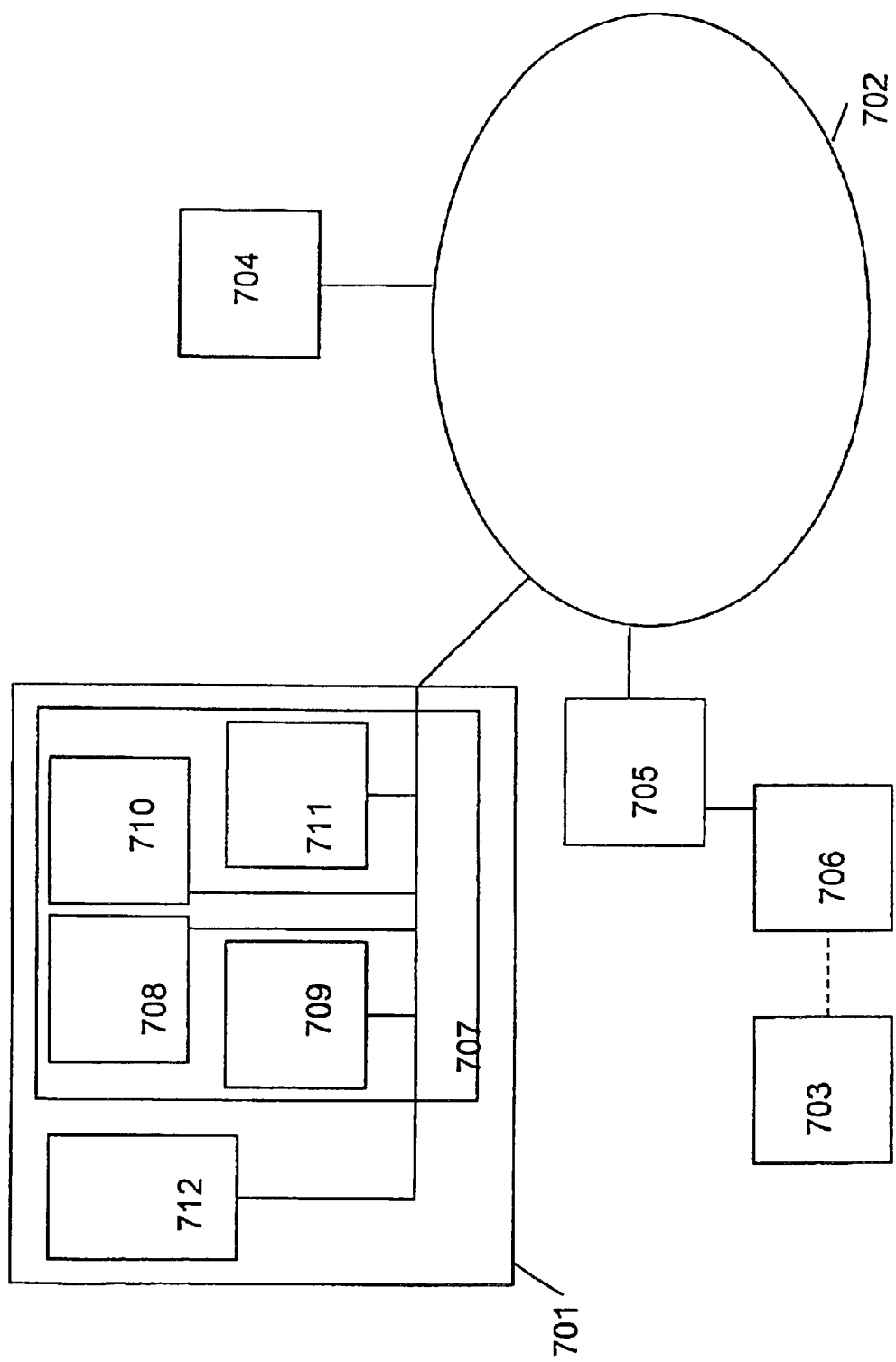
FIG. 7 is a block diagram showing the application level server according to the invention.

The communication system includes the IP network, using an resource reservation protocol, to which are connected:
the terminal via an access node;
the end node;
an resource reservation protocol proxy; and
an application level server that manages and maintains resource reservation, as depicted in FIG. 7.

The network and the entities use a resource reservation protocol on IP level, but the terminal might not use any resource reservation protocol on IP level. An opportunity to use the invention is when the network want to use a resource reservation protocol but the terminal does not have any resource reservation protocol. Instead it might have Asynchronous Transfer Mode (ATM) on the link level on which IP packets are transported. The terminal might use an access bearer on ATM level between the terminal and the access node.

The resource reservation protocol proxy and the server include each a respectively digital computer having an internal memory for storing a computer program.

The method includes the following steps:

501 The server indicates that the resource reservation signalling applies from the access node and towards the end node;

502 The server identifies parameters necessary for the resource reservation to establish end-to-end quality of service;

503 The resource reservation with quality of service on the IP level, between the access node and the end node is performed by means of the resource reservation protocol proxy.

504 An access bearer is established, with a quality of service, between the terminal and the access node on the link level, e.g. on the ATM level or the radio link level;

It is also possible to perform step 504 before step 503 or simultaneously.

Figure 8:
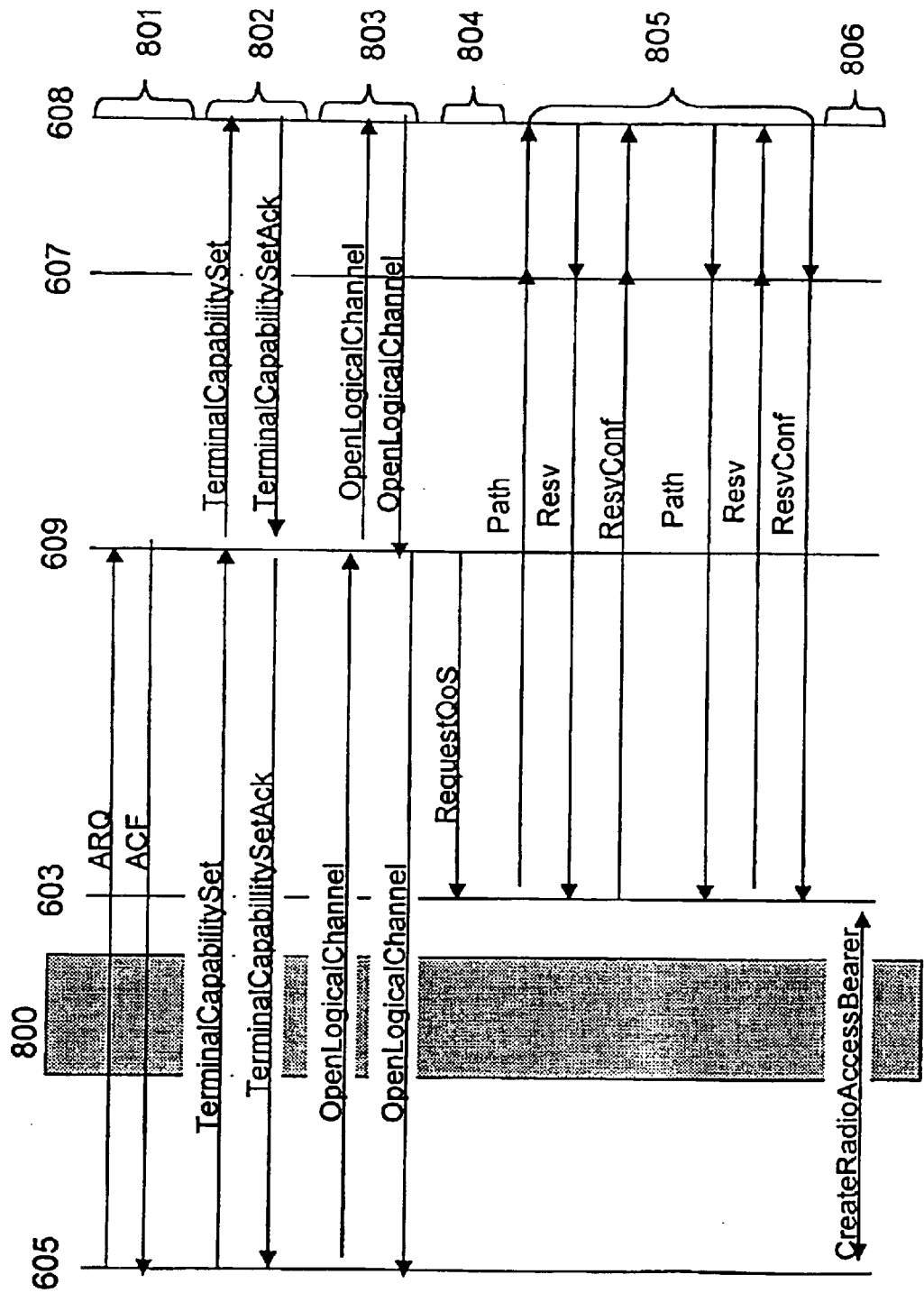
FIG. 8 shows a signalling sequence diagram according to the invention.

A more detailed description of the inventive method follows under FIG. 8.

Figure 6:
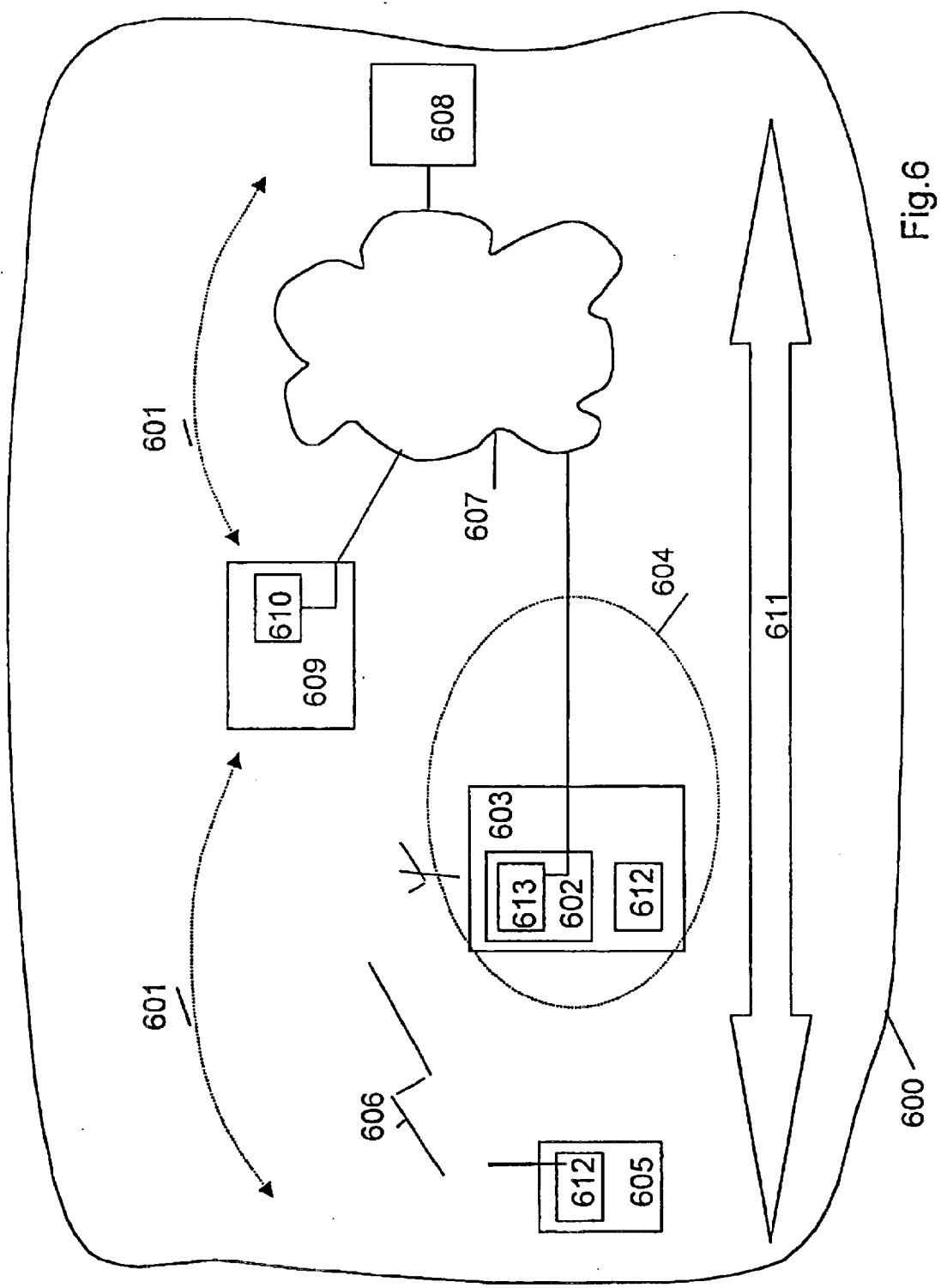
FIG. 6 is a schematic block diagram illustrating a communication system according to the invention.

FIG. 6 shows a schematic view of a communication system 600 in which quality of service is established between a terminal 605 and an end node 608 according to the invention. The communication system 600 is based on H.323 communication 601 in a cellular environment, e.g. based on General Packet Radio Service (GPRS), Enhanced Data rates of GSM and TDMA/136 Evolution (EDGE), and UMTS Terrestrial Radio Access Network (UTRAN) in Universal Mobile Telecommunication System (UMTS).

In this embodiment of the invention, the entities and the IP network uses the Resource Reservation Protocol (RSVP). Thus constitutes the resource reservation protocol proxy of an RSVP proxy 602, which in this case resides in a radio access node 603 within a subnetwork 604. The subnetwork in turn has access to an H.323 capable IP network 607.

The RSVP proxy 602 has means 613 for performing resource reservation to establish quality of service on an IP level, between the access node and the end node.

The terminal 605 and the access node 603 has both means 612 for establishing a radio access bearer with a quality of service on the link layer between terminal 605 and the access node 603.

The RSVP proxy 602 might reside in other entities in the subnetwork 604, which entities are not depicted in FIG. 6, where it is situated is not significant for the invention.

The subnet might e.g. constitute a radio access network or a radio access network and a core network.

The scenario applies to a H.323 Gatekeeper routed call scenario. The terminal 605 might consist of a laptop running the H.323 client software connected to a radio modem, providing the radio access. Other configurations are also possible.

The terminal 605 has access to the radio access node 603 via a radio access bearer 606. The end node 608 is connected to the IP network 607.

The communication system includes an application level server 609 according to the invention, which is shown more in detail in FIG. 7. The application level server 701 is connected to an IP network 702 and manages the resource reservation process of establishing quality of service, between a terminal 703 and an end node 704 by means of an resource reservation protocol proxy 705 according to the invention. The terminal 703 is connected to the IP network 702 via an access node 706, the access node 706 is connected to the proxy 705 and the proxy 705 is connected to the IP network. The end node 704 is connected to the IP network 702, which IP network 702 uses a resource reservation protocol. The server 701 might be e.g. a Gatekeeper managing H.225 and H.245 signalling protocols or a SIP proxy managing SIP, according to Prior Art, which according to the invention is modified to include a functional entity 707 that manages the resource reservation process of establishing quality of service by means of the resource reservation protocol proxy 705.

The server 701 has means 712 for indicating that the resource reservation protocol signalling applies between the proxy 705 the end node 704. Various means exists to accomplish quality of service between the proxy 705 and the access node 706, e.g. using over provisioning.

The functional entity 707 in the server has means 708 for identifying necessary parameters, from e.g. signalling messages, to be used for performing the resource reservation process.

Examples of necessary parameters are the receiver IP address of the end node 704, the receiver port identity of the end node 704, which quality of service mode the end node 704 intends to use and possibly quality of service information such as required bandwidth. The latter might be found out by the server by knowledge of the application e.g. the server notes that Global Service for Mobile transmission (GSM) speech encoding is used by the application and it and knows that the specific speech codec to be used in GSM, requires a specific amount of bandwidth. (A port is used in IP based systems to further address the process in the host to which the IP packet shall be forwarded.)

The functional entity 707 in server 701 also has means 709 for instructing the terminal to not use its resource reservation protocol if it has any.

The functional entity 707 in server 701 further has means 710 for changing signalling messages between the terminal 703 and the end node 704 and possibly other gatekeepers.

The terminal that is instructed to not use its resource reservation protocol indicates, in a signalling message towards the end node 704, that it has no resource reservation capabilities, but the end node 704 that has to use the resource reservation protocol towards the access node, has to get the information that there are resource reservation capabilities.

The terminal also indicates in another signalling message towards the end node that it shall not use resource reservation capabilities, but the end node 704 that shall use the resource reservation protocol towards the access node, has to get the information that resource reservation capabilities shall be used.

Signalling messages like these, passing the server 701 on its way towards the end node 704 or the terminal 703, are accordingly changed by the functional entity 706, before they are forwarded.

The functional entity 707 in server 701 also has means 711 for requesting from the resource reservation protocol proxy 705 the required quality of service between the proxy 705 and towards the end node. The by the functional entity 706 aggregated necessary parameters are passed on to the resource reservation protocol proxy 705 The resource reservation protocol proxy then performs the resource reservation with the requested quality of service between the proxy 705 and the end node 704.

Back to FIG. 6. The server 609, which is also connected to the IP network 607, constitutes, in this example of the present invention, a H.323 Gatekeeper 609 modified to including means 610 for managing the process of using the RSVP proxy 602 for establishing quality of service, as described above, under FIG. 7.

The RSVP proxy 602 has means for performing resource reservation with a by the Gatekeeper 609 requested quality of service between the access node and the end node.

The "real" RSVP capable quality of service is in this example of the present invention provided between the radio access node 603 and the end node 608, but relying on the fact that the radio link 606 provides its guaranteed quality of service, a "virtual" quality of service 611 at the IP layer is provided end-to-end. The RSVP proxy 602 and the GK 609 include each a respectively digital computer having an internal memory for storing a computer program.

FIG. 8 shows schematically a sequence diagram of the phases of establishing end-to-end quality of service, according to the invention, in the scenario described in FIG. 6. The entities and network described are the terminal 605, the Air interface 800 the radio access node 603 which includes the in FIG. 6 depicted RSVP proxy 602, the Gatekeeper 609, the H.323 and RSVP capable IP network 607 and the end node 608.

This Figure is simplified and schematic to. Focus is on parts of the signalling, relevant to the inventive method.

801 The terminal 605 requests admission to establish a call using H.225/RAS signalling from the Gatekeeper 609. Since it in this case is an entity running RSVP it also indicates that it has capabilities to reserve resources in the TransportQoS field of the ARQ message. The request is accepted and confirmed by the Gatekeeper 609 which tells the terminal 605, that the terminal shall not use its resource reservation capabilities or alternatively that the Gatekeeper 609 will reserve the necessary resources, in the TransportQoS field of the ACF message.

802 Call control signaling CCS, using H.225.0/Q.931 takes place as well as other signalling such a master slave determination, terminal capability exchange etc. using H.245 signalling. Among these the capability exchange signalling, which is of significance for the present invention, is shown in FIG. 8 as reference number 802. in the capability exchange signalling, the terminal 605 indicates in the Terminal Capability Set message, which is to be sent towards the end node 608, that quality of service is not going to be used since the terminal 605 is told to not use its resource reservation capabilities. But the end node 608 must not know the decision to not use resource reservation, since the quality of service will be established by the RSVP proxy within the radio access node 603. Accordingly, the Gatekeeper 609 changes the QoSMode field in the TerminalCapabillySet message from being not set to be set, as to indicate that quality of service is supported and also which type of quality of service mode, before it is forwarded towards the end node 608. This means that that RSVP signalling may be used between the radio access node 603 and the end node 607. The end node 608 answers, in a TerminalCapabilityset message in the opposite direction, which quality of service mode it will use. in RSVP there are different classes of quality of service modes, e.g. guaranteed quality of service or controlled lode. When this message, on the way towards the terminal 605, passes through the Gatekeeper 609, the Gatekeeper 609 intercepts the quality of service mode and removes which quality of service mode to be used from the message before forwarding it. The quality of service mode is one of the necessary parameters, to be used for performing the resource reservation process as described under FIG. 5. Further, this message indicates that quality of service is might be used, but the terminal 605 must not know that, since it will be established by the RSVP proxy within the radio access node 603. Accordingly also this message is further changed by the Gatekeeper 609 as to indicate that quality of service shall not be used, before it is forwarded to the terminal 605.)

803 When it is time to open a bi-directional logical channel, the terminal 605 sends an OpenLogicalChannel of H.245 to the Gatekeeper 609 which will forward the message further on to the end node 608. One bi-directional logical channel is opened for each type of flow needed, e.g. one for video, one for audio, one for data etc. Information conveyed may possibly contain the quality of service information, e.g. required bandwidth, type of delay, etc., (depending on the value returned by TransportQoS in the ACF). This quality of service information, such as peak bandwidth in bytes/sec, may be intercepted by the Gatekeeper 608 when it receives the OpenLogicalChannel message, but might also be deduced by the Gatekeeper 609, using knowledge about the application, e.g. if a channel with a GSM codec is opened, the GK 608 knows that it requires a specific amount of bandwidth etc. Other conveyed information is that receiver port etc. supplied is that of the RSVP proxy in the radio access node 603 and not the port within the terminal 605. Further conveyed information of significance is where, in the end node 608, the logical channel shall terminate, e.g. by indicating the port identification of the port to be used. This is returned in the OpenLogicalChannelAck message by the end node 608 to the terminal 605 via the Gatekeeper 609. The terminal receiver port identity etc. is used in the subsequent RSVP Path message received from end node 608.

804 The Gatekeeper 609 requests quality of service from the RSVP proxy in the radio access node 603, in a request quality of service message. The quality of service is requested between the radio access node 603 and the end node 608. The Gatekeeper 609 includes, the obtained quality of service information, quality of service mode, the receiver port identity of the end node 608 in the message to the RSVP proxy.

805 To establish a reservation between the RSVP proxy 602 in the radio access node 603 and towards the end node 608 to be used for a media stream going in the direction from the terminal 605 towards the end node 608, the RSVP proxy 602 in the radio access node 603 initiates the necessary resource reservation towards the end node 608, as requested in step 704, using the RSVP signaling message Path (as if it were sent from the terminal). The message includes the obtained quality of service information, quality of service mode and the receiver port identity of the end node 608, which are necessary for performing the resource reservation. When the subsequent RSVP Resv message is returned from the end node 608 towards the terminal 605, it is intercepted by the RSVP Proxy 602 which does not pass it on to the terminal 605. As a response to the Resv message, the RSVP Proxy 602 generates and sends an RSVP ResvConf message towards the end point 608 (as if it were sent from the terminal). To establish a reservation between the RSVP proxy 603 and towards the end node 608 to be used for a media stream going in the direction from the end node 608 and towards the terminal 605, the end node 608 (or another entity acting on behalf of the end node, such as the inventive proxy) initiates the necessary resource reservation towards the terminal 605 by sending an RSVP Path message towards the terminal 605. The Path message contains the necessary quality of service information, quality of service mode and the receiver port identity of the terminal 605, which are necessary for performing the resource reservation. The Path message is then intercepted by the RSVP proxy 602 in the radio access node 603 and is not passed on to the terminal 605. The RSVP Proxy 602 responds to the Path message by returning an RSVP Resv message toward the end point 608 (as if it were sent from the terminal). When the confirmation of the resource reservation is received in the RSVP ResvConf message from the end node 608 (or an entity acting on behalf of the end node, such as the inventive RSVP proxy) it is intercepted by the RSVP proxy 602 and not passed on to the terminal 605. The reservation is done per flow, in this case for a bi-directional communication.

806 A radio access bearer is established with a corresponding quality of service between the link layer in the terminal 605 and the link layer in the radio access node 603. in a UMTS network scenario, this would be initiated by the terminal 605 sending an ActivatePDPContextRequest message according to UMTS Session Management signaling (Technical Specification 24.008; "Mobile Radio Interface layer 3 specification, core network protocols—stage 3", v3.2.1, 3.sup.rd Generation Partnership Project (3 GPP)). When it is done is of no significance for the invention, only that it is necessary at some stage.

The end result is that resources are guaranteed end-to-end, but without sending RSVP over the air interface.

The methods according to the invention described are respectively implemented by means of a computer program product comprising the software code portions for performing the steps of the method. The computer program product is run on a computer stored in a digital computer within the server and within the resource reservation protocol proxy.

The computer program is loaded directly or from a computer usable medium, such as a floppy disc, CD, Internet, etc.

What is claimed is:

1. A method of establishing quality of service (QoS) between a terminal and an end node in an IP network utilizing resource reservation, the method comprising the steps of:
   connecting the terminal to the end node via an access node in the IP network;
   determining parameters necessary to establish a specific QoS between the terminal and the end node;
   determining whether the terminal is using resource reservation, wherein
   if the terminal is not using resource reservation:
      indicating that resource reservation signaling applies from the access node to the end node and
      identifying parameters necessary to establish the specific QoS; and
   if the terminal is using resource reservation;
      instructing the terminal to disable the resource reservation feature;
      responsive to the instructions to disable the resource reservation feature, the terminal sending a message towards the end node to indicate that the terminal shall not use resource reservation; and
   changing the message prior to forwarding to the end node to indicate that resource reservation capabilities shall be used, wherein the message change includes the determined parameters, including the specific QoS and type of QoS mode, wherein the specific QoS and type of QoS mode is supported only between the access node and the end node; and
   performing resource reservation between the access node and the end node utilizing a resource reservation proxy.

2. The method of claim 1, further comprising the step of:
   responding to the message, the end node sending a reply message to the terminal containing the quality of service that the end node will use.

3. The method of claim 2, further comprising the steps of:
   changing the reply message to indicate that QoS will not be used; end
   forwarding the message to the terminal.

4. The method of claim 1, wherein changing the message prior to forwarding to the end node further comprises resetting a QoS mode field from a not set status to a set status.

5. The method of claim 1, further comprising:
   establishing an access bearer, with a specific level of service on a link level between the terminal end the access node.

6. The method of claim 1, wherein the proxy initiates resource reservation between the access node and the end node by:
   sending a path signaling towards the end node, the message including QoS and QoS mode parameters;
   the proxy then receiving resource reservation signaling messages sent from the end node towards the terminal; and
   the proxy responding to the resource reservation signaling messages as required by protocol instead of forwarding the messages to the terminal.

7. The method of claim 6, wherein sending the path signaling message is performed by a node coupled to the IP network.

8. The method of claim 1, wherein the message is a TerminalCapabilitySet of H.245.

9. The method of claim 1, wherein the QoS mode is identified by the node in a TerminalCapabilitySet of H.245 from the reply message sent from the end node to the terminal.

10. The method of claim 1, further comprising requesting from the proxy, specific quality of service between the access node and the terminal according to the QoS determined from the initial terminal message.

11. A network node for routing calls and establishing quality of service (QoS) between a terminal and an end node in an IP network, wherein the IP network utilizes resource reservation signaling, the network node comprising:
   a resource reservation proxy coupled to the network node having means for performing resource reservation between the access node and the end node; and
   a functional entity resident on the network node having means for determining whether the terminal uses resource reservation wherein
   if the terminal is not using resource reservation,
      the functional entity utilizing means for indicating that resource reservation signaling applies from the access node to the end node and for identifying parameters necessary to establish the specific QoS between the terminal and the end node; and
   if the terminal is using resource reservation, the functional entity further including:
   means for instructing the terminal to operate without the resource reservation and
   upon the terminal sending a message towards the end node indicating that the terminal does not support resource reservation, means for changing the message, prior to forwarding to the end node, to indicate support for resource reservation, the changed
   message including the specific QoS and type of QoS mode that will be supported only between the access node and the end node.

12. The network node of claim 11, further comprising:
   means for responding to the message, wherein the end node sends a reply message containing the quality of service mode that the end node will use.

13. The network nods of claim 12, further comprising:
   means for changing the reply message from the end node to indicate that quality of service will not be used prior to forwarding the message to the terminal.

14. The network node of claim 11, wherein the means for changing the message prior to forwarding to the end node further comprises means for resetting a QoS mode field from a not set status to a set status.

15. The network node of claim 11, wherein means for sending instructions to the terminal to operate without resource reservation further comprises:
   means for sending an Authentication Control Function (ACF) signaling message of H.225/RAS from the node to the terminal.

16. The network node of claim 11, wherein the QoS mode is identified by the node in a TerminalCapabilitySet message of H.245 from the end node towards the terminal.

17. The network node according to claim 11, wherein the quality of service information is identified by the node in an OpenLogicalChannel message of H.245 sent from the terminal towards the end node.

18. The network node according to claim 11, wherein the specific QoS is identified a TerminalCapabilitySet of H.245 message from the terminal towards the end node.

19. The network node of claim 11, further comprising:
means for sending a request of quality of service message between the proxy and the end node, the message including the necessary parameters to support the request.

20. The network node of claim 11, further comprising:
means for establishing an access bearer, with a specific quality of service on a link level, between the terminal and the access node.

21. The network node of claim 11, wherein resource reservation is initiated by the proxy, by sending a Path signaling message from the access node towards the end node the message including the necessary parameters for performing the resource reservation.

22. A communication system comprising:
a network node for routing calls and establishing quality of service (QoS) between a terminal and an end node in an IP network, wherein the IP network utilizes resource reservation signaling, the network node comprising:
a resource reservation proxy coupled to the network node having means for performing resource reservation between the access node and the end node; and
a functional entity resident on the network node having means for determining whether the terminal uses resource reservation wherein
if the terminal is not using resource reservation, the functional entity utilizing means for
indicating that resource reservation signaling applies from the access node to the end node and
for identifying parameters necessary to establish a specific QoS for the terminal; and
if the terminal is using resource reservation, the functional entity further including:
means for instructing the terminal to operate without the resource reservation; and
upon the terminal sending a message towards the end node, to indicating that the terminal does not support resource reservation,
means for changing the message, prior to forwarding to the end node, to indicate support for resource reservation, the changed message including the specific QoS and type of QoS mode that will be supported only between the access node and the end node.

23. The communication system of claim 22, wherein the network node further comprises:
means for responding to the message, wherein the end node sends a reply message containing the quality of service mode that the end node will use.

24. The communication system of claim 23, wherein the network node further, comprises:
means for changing the reply message from the end node to indicate that quality of service will not be used and then forwarding the message to the terminal.

25. The communication system of claim 22, wherein the means for changing the message prior to forwarding to the end node further comprises:
means for resetting a QoS mode field from a not set status to a set status.

26. The communication system at claim 22, wherein means for sending instructions to the terminal to operate without resource reservation further comprises:
means for sending an ACF signaling message of H.225/RAS from the node to the terminal.

27. The communication system of claim 22, wherein the QoS mode is identified by the node in a TerminalCapabilitySet message of H.245 from the end node towards the terminal.

28. The communication system according to claim 22, wherein the quality of service information is identified by the node in an OpenLogicalChannel message of H.245 sent from the terminal towards the end node.

29. The communication system according to claim 22, wherein the specific QoS is identified in the TerminalCapabilitySet of H.245 message from the terminal towards the end node.

30. The communication system of claim 22, wherein the network node further comprises:
means for sending a request of quality of service message between the proxy and the end node, the message including the necessary parameters.

31. The communication system of claim 22, wherein the network node further comprises:
means for establishing an access bearer, with a specific quality of service on a link level, between the terminal and the access node.

32. The communication system of claim 22, wherein resource reservation is initiated by the proxy, by sending a Path signaling message from the access node towards the end node, the message including the necessary parameters for performing the resource reservation.

* * * * *

UNITED STATES PATENT AND TRADEMARK OFFICE
CERTIFICATE OF CORRECTION

PATENT NO. : 6,931,448 B2  
APPLICATION NO. : 09/768953  
DATED : August 16, 2003  
INVENTOR(S) : Jan Höller et al.

Page 1 of 1

It is certified that error appears in the above-identified patent and that said Letters Patent is hereby corrected as shown below:

In Column 11, Line 50, in Claim 3, delete "end" and insert -- and --, therefor.

In Column 11, Line 58, in Claim 5, delete "end" and insert -- and --, therefor.

In Column 12, Line 51, in Claim 13, delete "nods" and insert -- node --, therefor.

In Column 13, Line 44, in Claim 22, delete "to" before "indicating".

In Column 14, Line 17, in Claim 26, delete "at" and insert -- of --, therefor.

Signed and Sealed this

Twentieth Day of November, 2007

JON W. DUDAS  
*Director of the United States Patent and Trademark Office*

UNITED STATES PATENT AND TRADEMARK OFFICE
CERTIFICATE OF CORRECTION

PATENT NO. : 6,931,448 B2  Page 1 of 1
APPLICATION NO. : 09/768953
DATED : August 16, 2005
INVENTOR(S) : Jan Höller et al.

It is certified that error appears in the above-identified patent and that said Letters Patent is hereby corrected as shown below:

In Column 11, Line 50, in Claim 3, delete "end" and insert -- and --, therefor.

In Column 11, Line 58, in Claim 5, delete "end" and insert -- and --, therefor.

In Column 12, Line 51, in Claim 13, delete "nods" and insert -- node --, therefor.

In Column 13, Line 44, in Claim 22, delete "to" before "indicating".

In Column 14, Line 17, in Claim 26, delete "at" and insert -- of --, therefor.

This certificate supersedes the Certificate of Correction issued November 20, 2007.

Signed and Sealed this

Fourth Day of March, 2008

JON W. DUDAS
*Director of the United States Patent and Trademark Office*